AZIRIDINYLALKYL UREAS

George E. Ham, Lake Jackson, Tex., assignor to The Dow Chemical Company, Midland, Mich., a corporation of Delaware
No Drawing. Filed Jan. 31, 1964, Ser. No. 341,767
11 Claims. (Cl. 260—239)

This invention relates to new compositions of matter and to the preparation of such compositions. More particularly, the present invention relates to substituted urea compounds which contain at least one aziridinyl group per molecule, to the preparation of such urea compounds and to the use of these compounds in polymer compositions.

It is known that amines react with phenyl isocyanate. It is also known that phenyl isocyanate reacts with alkylene imines which contain an unsubstituted nitrogen atom to form resins, as disclosed in U.S. Patent 2,257,162 to Esselmann et al.

It has now been found that novel aziridinyl ureas may be prepared by the reaction of an isocyanate with an aziridinyl amine which has the nitrogen atom of the aziridinyl group bonded to a carbon atom. In this reaction, the aziridinyl group is not cleaved. The reaction by which the compounds of the invention are prepared may be represented by the following equation:

(I)

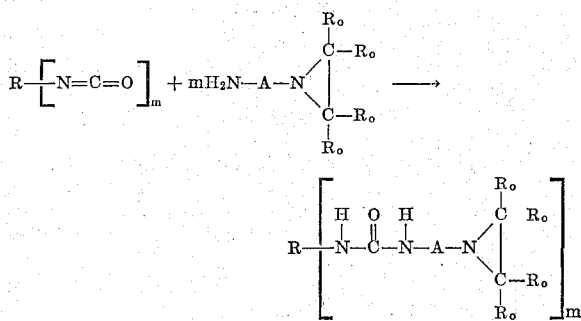

wherein $m$ is an integer of from 1 to 2 which represents the number of reacting isocyanate groups, R is a hydrocarbon group of from 1 to 12 carbon atoms with a valence equal to $m$, A is a divalent saturated hydrocarbon group of from 1 to 4 carbon atoms (such as a methylene, ethylene, propylene or butylene group) and each $R_0$ is independently selected from the group consisting of the hydrogen atom and a lower alkyl group of from 1 to 4 carbon atoms (such as a methyl, ethyl, n-propyl, i-propyl, n-butyl, i-butyl, sec.-butyl or tert.-butyl group). Typical R groups include phenyl, tolyl, duryl, cumyl, methyl, ethyl, n-propyl, butyl, pentyl, hexyl, heptyl, octyl, nonyl, decyl, undecyl, dodecyl, cyclopentyl, cyclohexyl, cycloheptyl, methylcyclohexyl, methylcyclopentyl, cyclopentadienyl, methylcyclopentadienyl, ortho-phenylene, para-phenylene, meta-phenylene, acetylenic groups (e.g., —C≡C—), α-naphthyl, benzyl, cyclohexenyl and phenethyl groups. Since the reactive moiety is the isocyanate group, any inert monovalent or divalent hydrocarbon radical of from 1 to 12 carbon atoms is suitable as an R group in the above reaction.

As used herein, the term "aziridinyl" is meant to represent the group

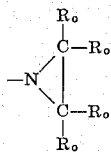

wherein each $R_0$ is as defined for Equation I.
Typical preparative reactions include the following:

(1)

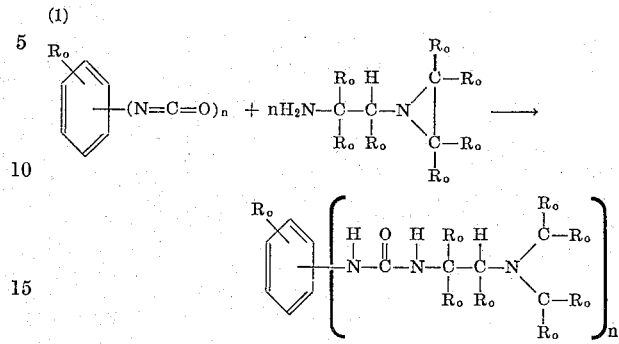

wherein R and each $R_0$ are independently selected from the group consisting of the hydrogen atom and a lower alkyl group of from 1 to 4 carbon atoms, $n$ is an integer of from 1 to 2 and the isocyanate groups may be at any position on the aromatic nucleus, it being understood that the unsubstituted carbon atoms of the phenyl group are bonded to hydrogen atoms.

(2)

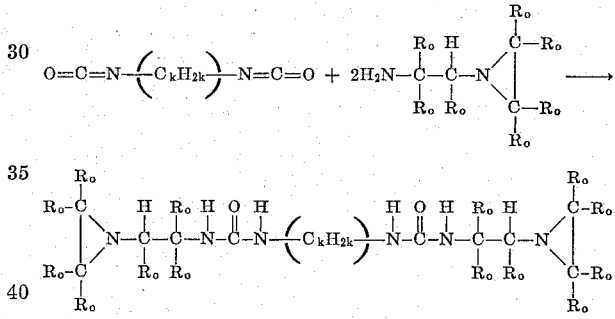

wherein $k$ is an integer from 2 to 12 and each $R_0$ is a hydrogen atom or a lower alkyl group of from 1 to 4 carbon atoms as previously defined.

(3)

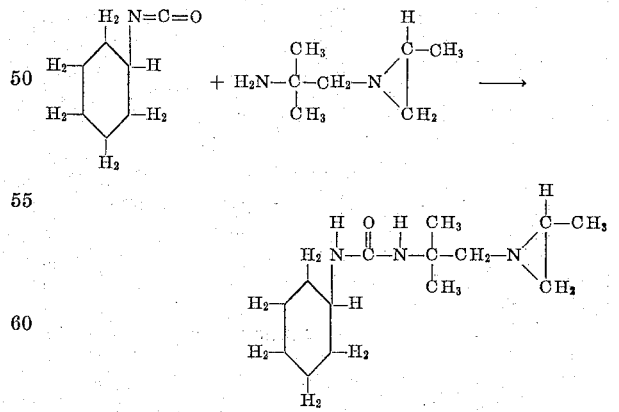

(4)

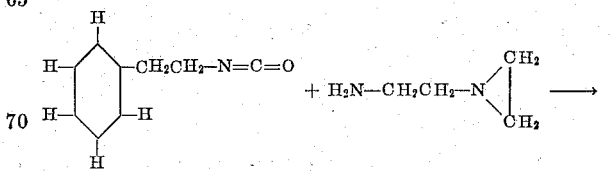

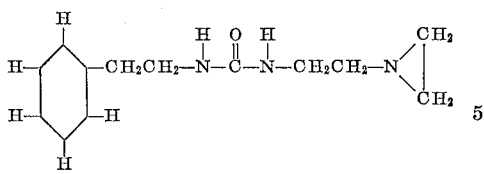
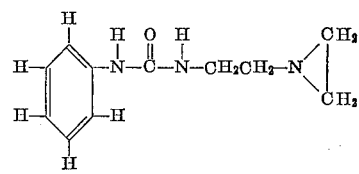

The process by which the compounds of the invention are prepared is generally carried out at temperatures of from about 40° to 95° C. The reaction is exothermic and once the reaction starts, it is not necessary to supply heat. The reaction temperature is easily controlled during the reaction by any conventional cooling means. Any convenient pressure of from a few hundredths of a millimeter of Hg up to several hundred atmospheres may be used. Since no economic advantages are obtained by the use of very high pressures, the reaction is generally carried out under atmospheric pressure or autogenous pressures if a closed vessel is employed. The process may be carried out continuously or batchwise, depending upon the amounts of aziridinyl urea compounds which are to be produced. The reactants are preferably combined in amounts sufficient to provide stoichiometric ratios (one molecule of aziridinyl amine for every isocyanate group) in the reaction zone. However, variations from the stoichiometric amounts of about ±10 mole percent may be used without a large reduction in urea product yields.

The urea compounds of the invention are useful as curing agents for olefin-anhydride copolymers such as styrene-maleic anhydride copolymers. The aziridinyl urea compounds of the invention are blended with styrene-maleic anhydride copolymers in amounts sufficient to provide at least one aziridinyl group for every maleic anhydride molecule. The resulting blends have good film forming properties and may be used as coatings or as adhesives in the formation of laminates (wood, metal, plastic). In a typical film preparation, a styrene-maleic anhydride copolymer is combined with an amount of aziridinyl urea compound sufficient to provide at least one aziridinyl group per maleic anhydride molecule. The resulting blend may be dissolved in a suitable solvent (such as methyl ethyl ketone) and poured or sprayed on the article to be coated. Evaporation of the solvent leaves a thin coating of the blend which is then cured at elevated temperatures (from 75° to 180° C. for from 5 minutes to 24 hours). The resulting films are water-proof, resistant to acetone, toluene and ethylene dichloride and have excellent adhesion properties when applied to metals such as bonderized steel. Films obtained using sulfur-containing compounds in place of the aziridinyl urea compounds were not resistant to solvents such as acetone, toluene or ethylene dichloride.

The following examples are submitted for the purpose of illustration only and are not to be construed as limiting the scope of the invention in any way.

*Example I*

Into a reaction vessel equipped with a means for stirring and temperature control was placed 8.6 grams (~0.1 mole) of 1-(2-aminoethyl)aziridine dissolved in 100 milliliters of $CCl_4$. To this mixture was added 11.9 grams (~0.1 mole) of phenyl isocyanate dissolved in 100 milliliters of $CCl_4$. An exothermic reaction occurred and the temperature of the reaction mixture reached 51° C. Upon completion of the reaction (as shown by decreasing temperature of the mixture), the reaction mixture was cooled to 25° C. and $CCl_4$ was removed under reduced pressure. There was obtained 20.1 grams of urea product (melting point 131°–132° C.) which was recrystallized from a 50/50 mixture of benzene/n-hexane.

*Analysis* (Percent by Weight).—Theory ($C_{11}H_{15}N_3O$): N, 20.47. Found: N, 20.47.

The infrared spectrum was consistent with that expected for N-phenyl-N'-2-(1-aziridinyl)ethyl urea:

*Example II*

Using a procedure and apparatus similar to that of Example I, the following were combined:
  (a) 8.6 grams (~0.1 mole) of 1-(2-aminoethyl)aziridine in 100 milliliters of $CCl_4$, and
  (b) 16.9 grams (~0.1 mole) of 1-naphthyl isocyanate in 100 milliliters of $CCl_4$.

The reaction mixture reached a maximum temperature of 51° C. The $CCl_4$ was removed under reduced pressure and 23.3 grams of urea products (melting point: 143° C.) was separated.

*Analysis* (Percent by weight).—Theory ($C_{15}H_{17}N_3O$): N, 16.5. Found: N, 17.3.

The infrared spectrum was consistent with that expected for N-(1-naphthyl)-N'-2-(1-aziridinyl)ethyl urea:

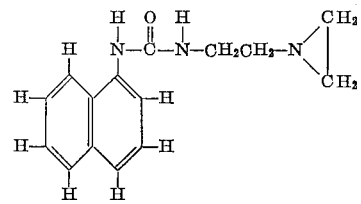

*Example III*

Using the procedure and an apparatus similar to that employed in Example I, the following were combined using carbon tetrachloride as a solvent:
  (a) 8.6 grams (~0.1 mole) of 1-(2-aminoethyl)aziridine, and
  (b) 13.3 grams (~0.1 mole) of o-tolyl isocyanate.

The reaction was exothermic (maximum temperature 51° C.). After removal of the solvent, there was obtained 15 grams of urea product with a melting point of 132°–136° C.

*Analysis* (percent by weight).—Theory ($C_{12}H_{17}N_3O$): N, 19.15. Found: N, 18.43.

The infrared spectrum of the product was consistent with that expected for N-o-tolyl-N'-2-(1-aziridinyl)ethyl urea:

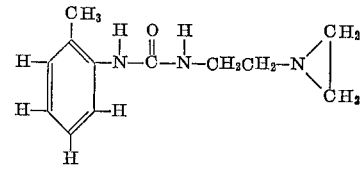

*Example IV*

Using the same procedure as in the preceding examples, the following reagents were combined:
  (a) 17.2 grams (~0.2 mole) of 1-(2-aminoethyl)aziridine, and
  (b) 16.8 grams (~0.1 mole) of hexamethylene diisocyanate.

The reaction was exothermic (maximum temperature 81° C.). The solid urea product (31.6 grams) was separated from the mixture by filtering. The product had a melting point greater than 260° C.

*Analysis* (percent by weight).—Theory ($C_{16}H_{32}N_6O_2$): N, 24.70. Found: N, 23.3.

The infrared spectrum was consistent with that expected for:

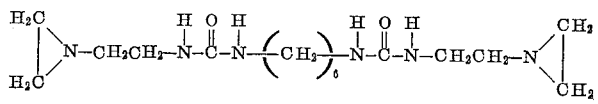

Example V

The following reagents were reacted using the procedure of the preceding examples:

(a) 17.2 grams (~0.2 mole) of 1-(2-aminoethyl)aziridine, and (b) 17.51 grams (~0.1 mole) of toluene diisocyanate (a commercial mixture containing the 2,4- and 2,6-isomer in an approximate weight ratio of 80:20, respectively).

The reaction was exothermic and the temperature of the reaction mixture rose to 76° C. The solid urea product (36.0 grams) was separated from the reaction mixture by filtering. Melting point of the urea product was greater than 275° C. The infrared spectrum of the urea product was consistent with that for:

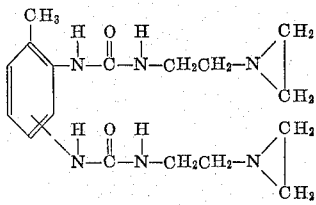

Example VI

A 1 gram sample of a copolymer of styrene-maleic anhydride (about 50 percent by weight of maleic anhydride) was dissolved in 10 milliliters of methyl ethyl ketone. A second solution of 0.80 gram of the product from Example I (N-phenyl-N'-2-(1-aziridinyl)-ethyl urea) dissolved in 10 milliliters of methyl ethyl ketone was mixed with the first solution and the mixture was poured onto a bonderized steel panel 4" x 12" x 1/16"). The solvent evaporated and a film of 0.5 ml. (.0005 inch) thickness was formed. This film was cured at 140° C. for 30 minutes. The resulting cured coating had excellent adhesion properties and was waterproof. The coating was unaffected when treated with acetone, ethylene dichloride and toluene. When the compound of Example II (N-(1-naphthyl)-N'-2-(1-aziridinyl)ethyl urea) was used instead of the compound of Example I, a coating which was unaffected by water, acetone, ethylene dichloride or toluene was obtained. When the compound of Example III (N-o-tolyl-N'-2-(1-aziridinyl)ethyl urea) was used instead of the compound of Example I, a coating which was unaffected by water, acetone, ethylene dichloride or toluene was obtained.

I claim as my invention:

1. A compound of the formula

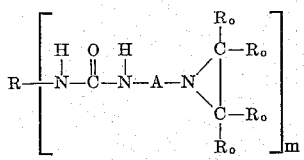

wherein:
(a) $m$ is an integer from 1 to 2,
(b) R is a hydrocarbon group from 1 to 12 carbon atoms with a valence equal to $m$,
(c) —A— is a divalent saturated hydrocarbon group of from 1 to 4 carbon atoms, and
(d) each $R_o$ is independently selected from the group consisting of the hydrogen atom and a lower alkyl group of from 1 to 4 carbon atoms.

2. A compound of the formula

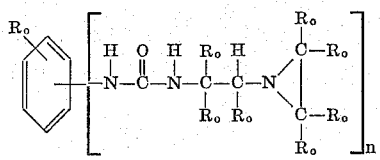

wherein:
(a) $R_o$ is independently selected from the group consisting of the hydrogen atom and a lower alkyl group of from 1 to 4 carbon atoms,
(b) $n$ is an integer from 1 to 2, and
(c) every unsubstituted carbon atom on the aromatic nucleus is bonded to a hydrogen atom.

3. A compound of the formula

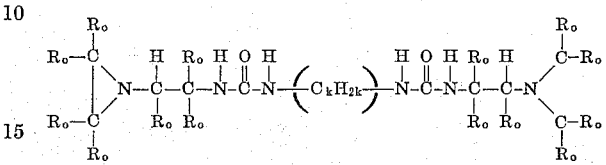

wherein:
(a) $k$ is an integer of from 2 to 12, and
(b) each $R_o$ is independently selected from the group consisting of the hydrogen atom and a lower alkyl group of from 1 to 4 carbon atoms.

4. A compound of the formula

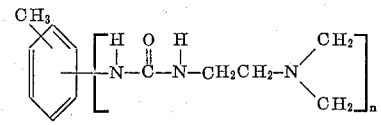

wherein $n$ is an integer from 1 to 2 and each unsubstituted carbon atom of the phenyl nucleus is bonded to a hydrogen atom.

5. A compound of the formula

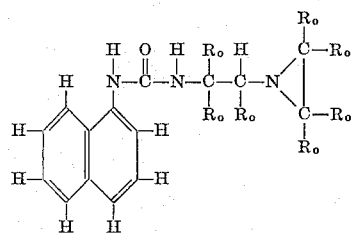

wherein each $R_o$ is selected from the group consisting of the hydrogen atom and a lower alkyl group of from 1 to 4 carbon atoms.

6. The compound:

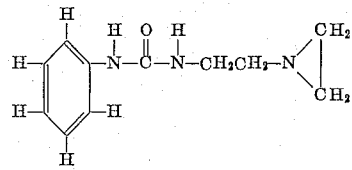

7. The compound:

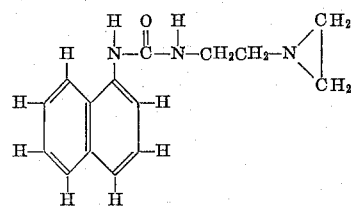

8. The compound:

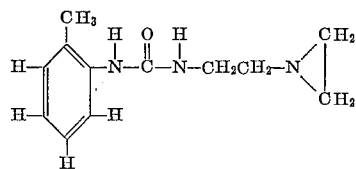

9. The compound:

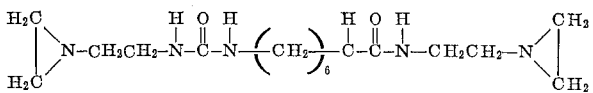

10. A method of preparing substituted urea compounds which comprises reacting
   (I) a compound of the formula

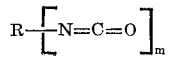

and
   (II) a compound of the formula

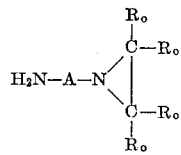

wherein:
   (a) $m$ is an integer of from 1 to 2,
   (b) R is a hydrocarbon group of from 1 to 12 carbon atoms with a valence equal to $m$,
   (c) —A— is a divalent saturated hydrocarbon group of from 1 to 4 carbon atoms, and
   (d) each $R_o$ is independently selected from the group consisting of the hydrogen atom and a lower alkyl group of from 1 to 4 carbon atoms.

11. The process according to claim 10 wherein the reaction is carried out at a temperature of from 40° to 95° C.

No references cited.

ALEX MAZEL, *Primary Examiner.*
ALTON D. ROLLINS, *Assistant Examiner.*